Figure 1:
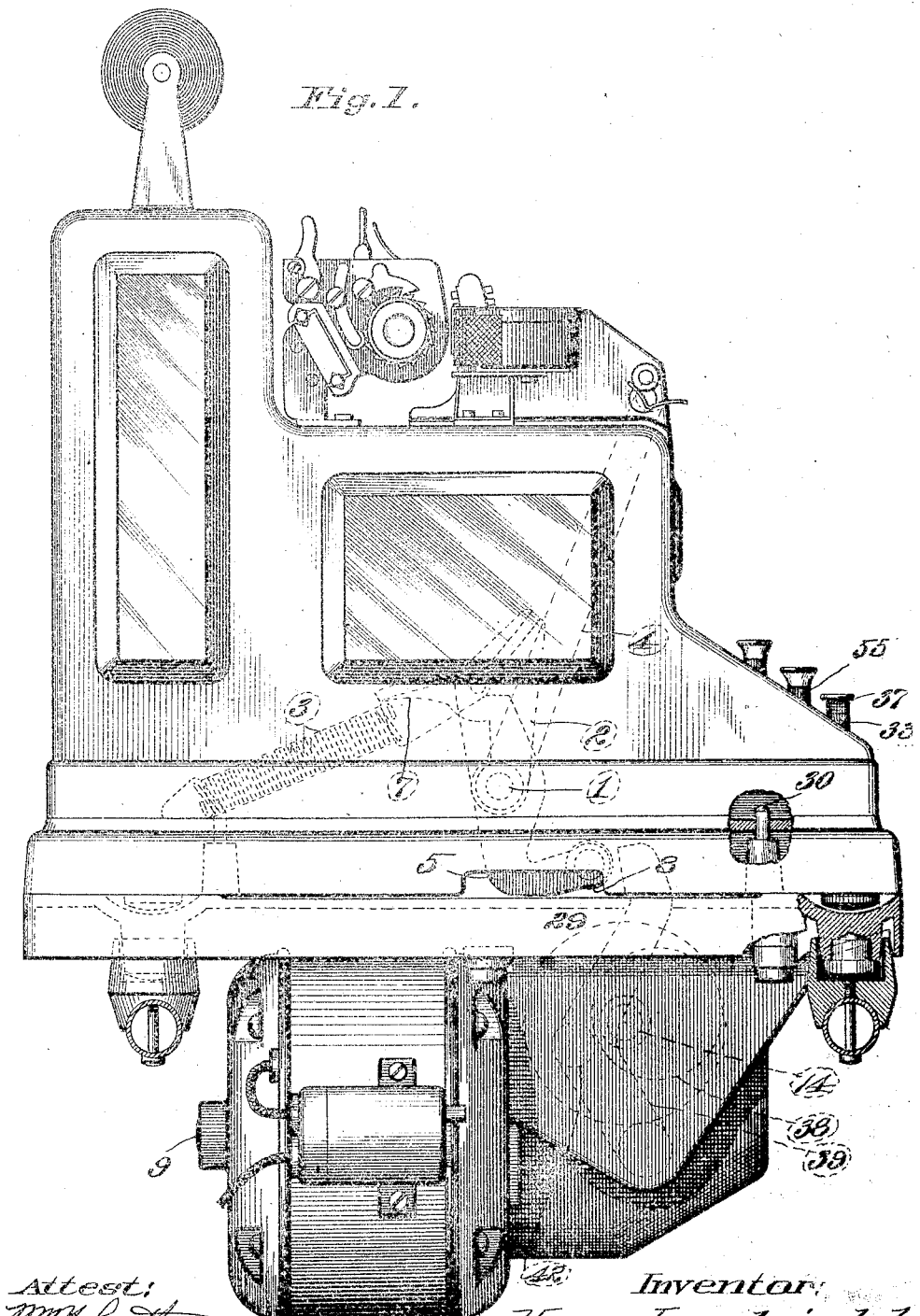

H. LANDSIEDEL.
MOTOR MECHANISM FOR ADDING MACHINES.
APPLICATION FILED JUNE 5, 1912.

1,209,858.

Patented Dec. 26, 1916.
4 SHEETS—SHEET 1.

Attest:
Wm H Scott
L C Kingsland

Inventor:
Harry Landsiedel,
by J. D. Rippey
Atty.

H. LANDSIEDEL.
MOTOR MECHANISM FOR ADDING MACHINES.
APPLICATION FILED JUNE 6, 1912.
1,209,858.
Patented Dec. 26, 1916.
4 SHEETS—SHEET 2.
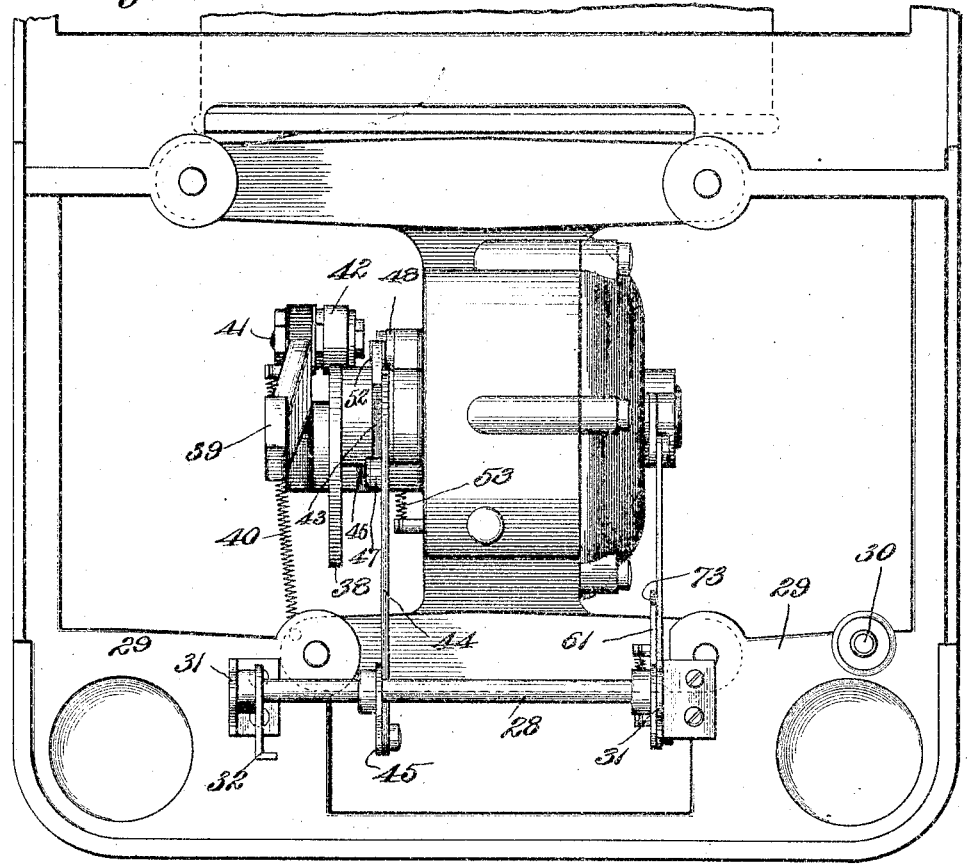
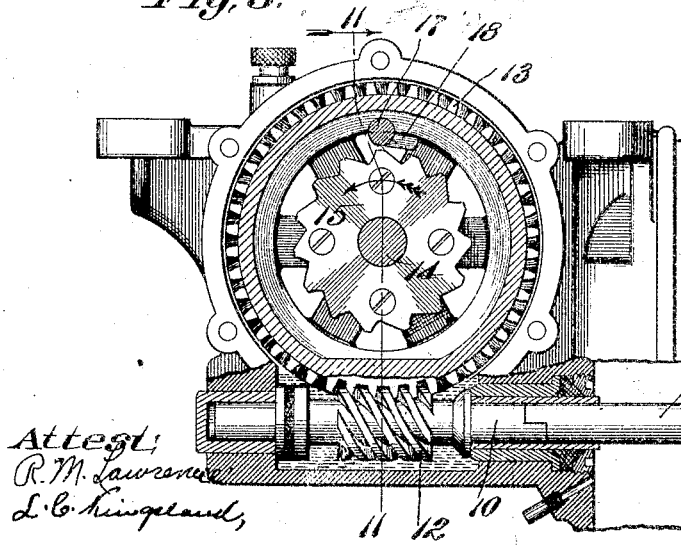
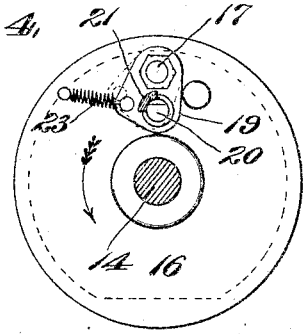
Inventor:
Harry Landsiedel,
by J. D. Rippey, Atty
Attest:
R. M. Lawrence
L. C. Lingland

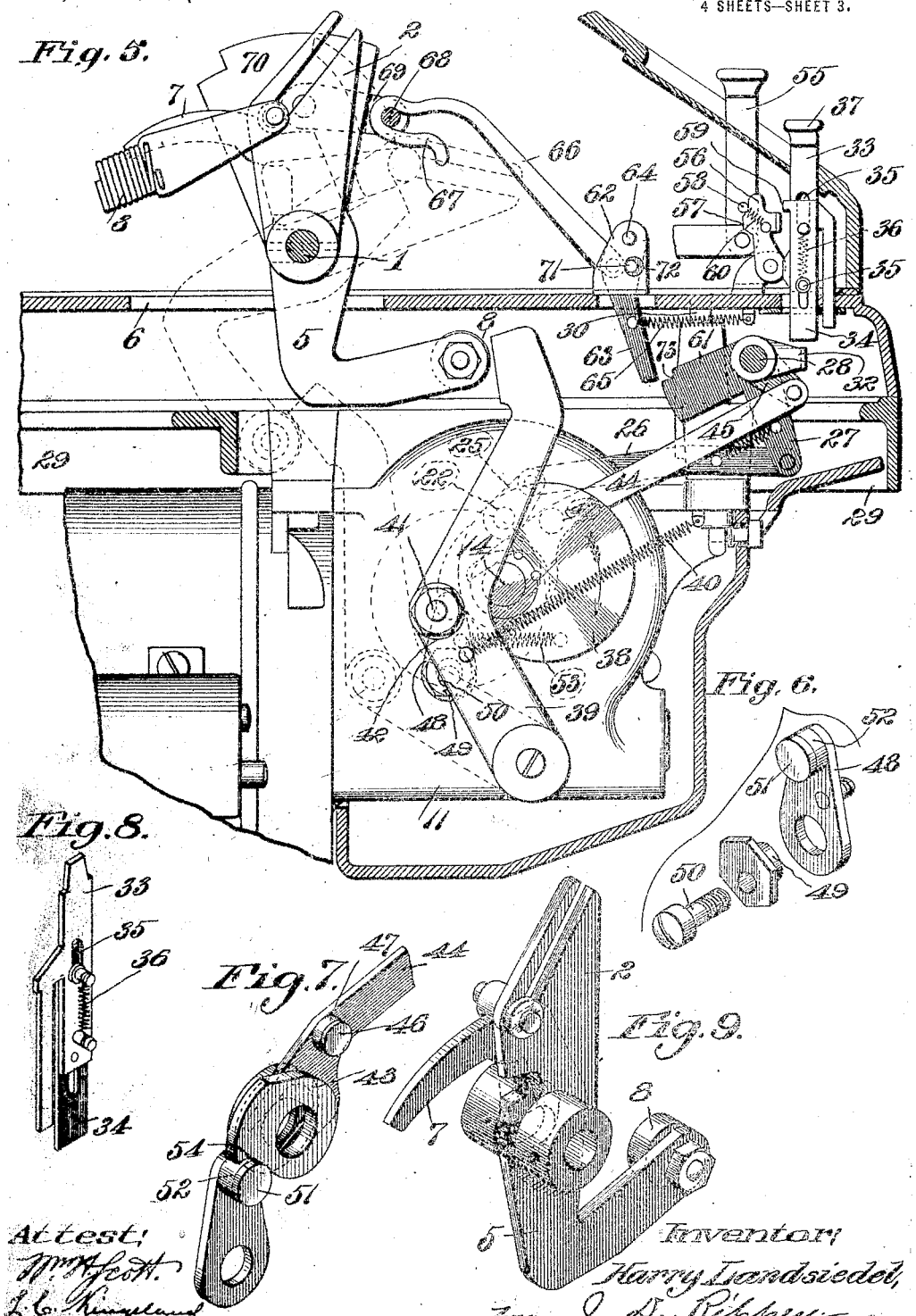

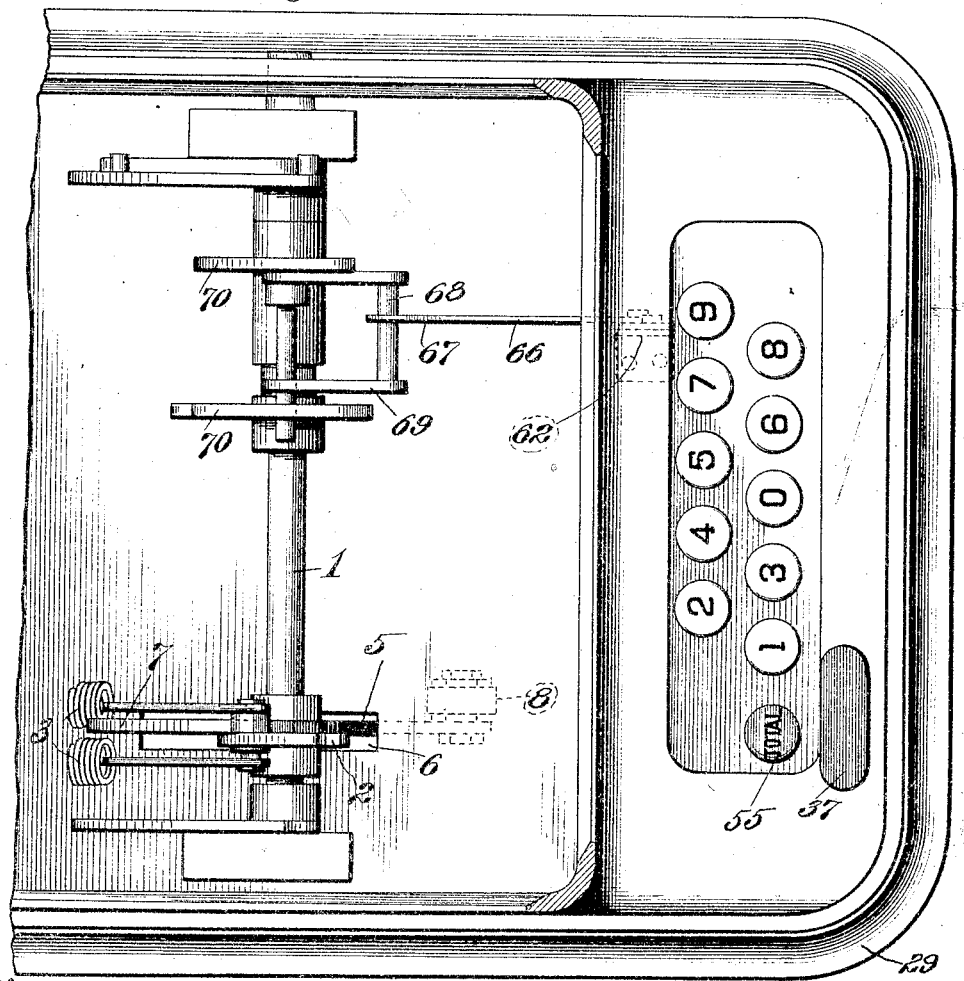
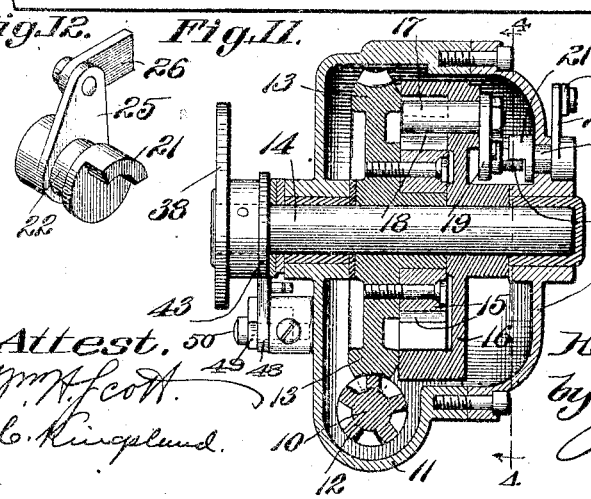
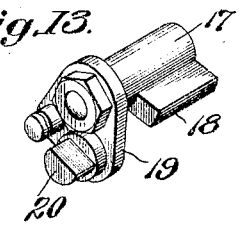

UNITED STATES PATENT OFFICE.

HARRY LANDSIEDEL, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

MOTOR MECHANISM FOR ADDING-MACHINES.

1,209,858.  Specification of Letters Patent.  Patented Dec. 26, 1916.

Application filed June 6, 1912. Serial No. 702,113.

*To all whom it may concern:*

Be it known that I, HARRY LANDSIEDEL, a citizen of the United States, residing at Poplar Bluff, in the county of Butler and State of Missouri, have invented new and useful Improvements in Motor Mechanisms for Adding-Machines, of which the following is a specification enabling those skilled in the art to which my invention appertains to understand the same.

This invention relates to operating mechanism for adding machines and the like, whereby the machines may be operated by power driven mechanism under control of the operator instead of by a hand lever or other manually operated appliances.

The invention relates specifically to mechanism whereby operation of the motor will rock the main or controlling shaft of the machine in one direction and leave the shaft free for automatic return to idle or normal position.

An object of the present invention is to provide improved mechanism whereby the motor, at the will of the operator, may be caused to rock the main or controlling shaft of the machine in one direction, and at a predetermined position release said shaft and leave the shaft free for its automatic return movement.

Another object is to provide a shaft to be rotated continuously in one direction when the motor is running, in combination with a wheel driven constantly in one direction by said shaft, a series of levers, and key controlled mechanism whereby said wheel will operate said levers effectively to rock the main or controlling shaft of the machine in one direction for a predetermined distance and then leave said shaft free to be returned to idle position by other means.

Other objects will appear from the following description, reference being made to the accompanying drawings in which I have illustrated my invention, combined with a Dalton adding machine, for rocking the main or controlling shaft of said machine. The Dalton adding machine is constructed in substantial conformity with the adding and listing mechanism constituting a part of the subject-matter of Hubert Hopkins's Patent No. 1039130, dated September 24, 1912.

In the drawings Figure 1 is a side elevation of a Dalton adding machine, having my present invention combined therewith. Fig. 2 is a plan view of the motor-support, illustrating the key controlled connections carried by said support independently of the adding machine; the key controlling said connections, however, being carried in the key-board of the adding machine. Fig. 3 is a sectional view, showing the motor-driven shaft, the gear driven by said shaft, and the interlocking or latching mechanism, whereby said shaft and gear may be caused to rock the main or controlling shaft of the machine. Fig. 4 is a detail sectional view taken on the line 4—4 of Fig. 11, the casing structure being omitted. Fig. 5 is a sectional view, enlarged in reference to the preceding views of the drawings, illustrating in detail the key connections for controlling the motor, and also illustrating levers whereby the motor will rock the main or controlling shaft of the machine in one direction and leave the said shaft free to be returned independently. Fig. 6 is a perspective of a detent and its support, the parts being shown separately. Fig. 7 is a perspective view of a part of the devices whereby the key and connections controlling operation of the motor are returned to idle position after each depression, by the operation of the motor; the detent shown in Fig. 6 also appears in this view. Fig. 8 is a perspective view of the two-part key which controls operation of the motor. Fig. 9 is a perspective view of the levers on the main or controlling shaft of the machine which are operated by the motor to rock said shaft in one direction, and which are operated by other means to return the shaft to its idle position. Fig. 10 is a plan view of the key-board and a portion of the base of the machine, illustrating the main or controlling shaft, and the connections controlled by said shaft for locking the motor-controlling key against operation while said shaft is in rocking operation. Fig. 11 is a sectional view on the line 11—11 of Fig. 11. Fig. 12 is a perspective view of the device which controls the latch or lock, whose operation is necessary before the motor will transmit motion to the main or controlling rock shaft of the machine. Fig. 13 is a perspective view of the latch or locking device which is controlled by the parts shown in Fig. 12.

The adding and recording mechanisms of the Dalton adding machine are controlled in their operations by a rock shaft 1 and connections therefrom. The said rock shaft has an arm or lever 2 attached thereto, and strong springs 3 are connected to said lever and to the base of the machine. When the shaft 1 is rocked in one direction, in opposition to said springs, the springs are extended and the adding and recording mechanisms operate. When the rock shaft reaches the limit of its rocking movement in opposition to said springs, it is released and is returned automatically to idle position by the power of said springs. In many cases the shaft 1 is equipped with a hand lever 4, whereby the shaft may be operated manually in one direction and then returned to idle position by the springs. My present invention consists of a motor and novel and improved mechanism, whereby the motor will rock the shaft in one direction and then leave the shaft free to be returned to idle position by the springs 3, thereby dispensing with hand lever 4; my invention also includes novel key mechanism including a key arranged in the key-board of the machine, with connections therefrom, the operation of which is necessary before the motor will rock the main or controlling shaft 1.

As a part of my invention the rock shaft 1 has a lever 5 attached thereto and extending downwardly through a slot 6. (Figs. 5 and 10) in the base of the machine. Said lever has a rearward extension 7 on its upper extremity, which extension engages with the element connecting the springs 3 with the lever 2. The engagement of the lever 5 with the element holding the springs 3 in connection with the lever 2, is not a rigid engagement, but is such that the said extension may move under the said connecting element and raise the same within the slot in which it rests. This prevents the shaft 1 from being started with a violent jerk when the motor is suddenly operated to rock the shaft. The lever 5 at its lower end is equipped with a roller 8 to be engaged by the motor driven lever hereinafter described.

The motor shaft 9 is in constant rotation when the motor is running and is interlocked with shaft 10 which, in effect, is an extension of said shaft 9 and, therefore, rotates and stops with said shaft 9. The shaft 10 is journaled in bearings within a case 11, adapted to contain oil to lubricate the mechanism inclosed in the case, as shown in Fig. 3. The shaft 10 is provided with a worm 12 in constant mesh with a worm gear wheel 13, which is loosely mounted on a shaft 14. A disk 15 is attached to the gear 13 and rotates therewith. Said disk 15 has teeth upon its periphery, as clearly shown in Fig. 3. A latch support 16 is attached to the shaft 14 and has a stud 17 revolubly mounted therein. The stud 17 extends across the periphery of the disk 15 and is provided with a hook or blade 18 which is normally, that is in idle position of the parts, supported out of engagement with the disk 15, as shown in Fig. 3, so that said disk 15 may constantly rotate with the wheel 13 without rotating the shaft 14. Manipulative connections (hereinafter described) are provided, whereby engagement of the latching device with the disk 15 may be effected so that the shaft 14 will be rotated. The devices for holding the latch 17 disengaged from the disk 15 include an arm 19 on the outer end of the stud 17, having a projection 20 engaging with a stop 21 on a support 22. A spring 23 (Fig. 4), connects the arm 19 with the support 16 and actuates said arm 19 to engage the latch 17 with the disk 15 whenever the stop 21 is released. The support 22 is arranged in a bearing in the case 24 which incloses the mechanism on the shaft 14. An arm 25 is attached to the outer end of the support 22 and is pivoted to the rear end of a link 26. The forward end of the link 26 is pivoted to the lower arm of a bell crank lever 27, attached to a rock shaft 28. The rock shaft 28, together with the motor and the mechanism driven by the motor for operating the rock shaft 1, is supported by a frame 29 constituting a support upon which the machine may be mounted without previous adjustment of any of the mechanism, and from which the machine may be removed without previous separation of any of the parts. Thus the supporting frame for the motor also constitutes the support for the machine, and the machine may be placed upon the motor support or removed therefrom, at will without previous manipulation of any of the parts. In this way the motor itself, the support therefor, and the parts driven directly by the motor are made to constitute a separate unit in the combination; and the machine proper constitutes another separate unit; and these two units may be placed together for coöperation in the position shown in Fig. 1, without any previous adjustment and without the necessity of manipulating any coupling devices to effect the coöperative entrainment of the mechanisms. In the embodiment shown, the supporting frame 29 is provided with projections 30 arranged to fit into holes in the base of the machine so as to hold the machine and motor in proper adjustment during operation.

The shaft 28 is supported in bearings 31 (Fig. 2), and has affixed thereto an arm 32, whereby said shaft may be rocked effectively to move the link 26 and cause, or permit, the latching device 17—18 to engage with the disk or wheel 15 and thereby entrain the motor driven mechanism with the parts whose operation is necessary in order to rock the shaft 1. Convenient to the key-board of the machine, in which the numeral keys are arranged, a key stem 33 is located and is connected with a supplemental stem 34 by means of pin and slot connections 35. A spring 36, connecting the two parts 33 and 34 which form the stem, provides a yielding connection holding the said two parts extended to the greatest length possible to move them. Thus the spring 36 and the pin and slot connections 35 constitute a yielding connection between the two parts of the stem, permitting relative movement of said two parts. The lower end of the part of the stem designated by 34 is arranged to rest over the arm 32. The upper extremity of the part of the stem designated by 33 is provided with a finger button 37. From the foregoing it will be seen that when the key 37 is depressed, the link 26 will be operated, releasing the stop 21 from the projection 20, thus permitting the latch device 17—18 to engage with the disk or wheel 15. The outer end of the shaft 14 has a disk 38 attached thereto eccentrically. The eccentric disk 38 is normally stationary, or idle, but when the shaft 14 is rotated, which occurs whenever the key 37 is operated as above described, said disk is also rotated. A lever 39 is pivotally supported by the frame or housing carrying the motor driven mechanism. Said lever 39 is normally held in its forward idle position by a spring 40. The upper extremity of the lever 39 is adjacent to, but actually out of contact with, the roller on the end of the lever 5. Thus it will be seen that there is no direct connection between the motor, or between the motor driven mechanism, and the rock shaft to be operated thereby. The lever 39 carries a stud 41 on which is a roller 42, against which the periphery of the disk 38 operates when rotated, to effect operation of the lever 39 and thereby rock the rock shaft 1.

The shaft 14 has a cam 43 thereon. A link 44 extends from an arm 45 on the shaft 28 and has a bifurcation, embracing the shaft at the side of the said cam. A projection 46 on the link 44 supports a roll 47 which is engaged by the cam 43 shortly after the shaft 14 starts to rotate on depression of the key 37. The effect of the cam engaging the roll 47 is to restore the link 44 and thereby restore the link 26 to idle position, thus again bringing the stop 21 into the path of movement of the projection 20. Therefore, when the projection 20 is carried around to its starting point, said projection again engages the stop 21, thereby raising and disconnecting the latch 17—18 from the disk or wheel 15. The motor continues to operate, but the connection between the motor and the shaft 14 is thus broken or separated so that the shaft 14 stops and remains stationary until the key 37 is again depressed.

An arm or lever 48 is pivoted upon an eccentric axis 49 (Figs. 6 and 11), said axis being eccentrically and revolubly mounted on a stud 50. The stud 50 is a screw which may be adjusted to hold the axis 49 in any position, thereby accurately adjusting the arm or lever 48 to any required position. Thus the lever 48 may be raised or lowered so that it will perform its functions under varying conditions, such as when the parts become worn or relatively disarranged within limits. The said arm or lever 48 has a stud 51 on its upper or free end, and a roller 52 is supported on said stud. The roller 52 is arranged to press against the edge or periphery of the cam 43. A spring 53 has one end connected to the arm or lever 48, and the other end connected to a part of the case 24, thereby pressing the roller 52 against the cam 43. The cam 43 has a rounded notch or intake 54 arranged to receive the roller 52 when the parts are at rest or normal. The lever 48 and the roller 52, therefore, act also as a stop or detent to hold the shaft 14 and the parts carried thereby from backward rotation, so that when said parts are stopped by engagement of the projection 20 with the stop 21, said parts will be held in the position in which they are when stopped and disengaged.

Adding and listing machines of various types, and particularly the adding machines of the Dalton type, are provided with a key 55 whose operation is necessary when it is desired to "clear" the machine, or to print a total or sub-total contained or represented in the adding mechanism of the machine. It is desirable that the key 55 be held from operation after the key 37 has been depressed and the operating mechanism has been entrained with the motor. As a part of my present invention a locking plate 56 is pivotally supported near the stem of the key 55 and has a shoulder 57 thereon. A pin 58 is carried by the stem of the key 55 and is arranged to rub against the shoulder 57 when said key 55 is depressed. This swings the plate 56 toward the stem of the key 37. The stem of the key 37 as previously described, is composed of two parts, and the part 34 has a projection 59. When the plate 56 is moved toward the part 34, a shoulder on the said plate becomes positioned under the projection 59, thereby locking the key 37 against depression until the key 55 has been moved the required distance. The pin 58 is carried below the shoulder 57 and assumes a position below said shoulder when the key 55 is properly adjusted for "clearing" operation or for taking a total or sub-total. A spring 60 thereupon, draws the plate 56 away from the stem of the key 37 so that said key 37 can be depressed and the shaft 1 can be rocked by the motor after the key 55 has been set for a "clearing" operation, or for taking a total or sub-total. It will be noted also that when the key 37 is depressed, the shoulder 59 will prevent movement of the plate 56, thus preventing operation of the total key 55 until after the said key 37 has returned to its idle position. Thus the plate 56 performs the function of locking the key 37 against operation, while the total key 55 is being moved for a clearing or total-taking operation; and said plate also locks the said key 55 against operation while the key 37 is being depressed.

The shaft 28 has an arm 61 which, in the present instance, is one arm of the lever 27 heretofore referred to as a bell crank lever. The base of the adding machine supports a bracket 62, (Figs. 5 and 10) to which a latch pawl or detent 63 is pivoted by means of a pivot pin 64. The latch pawl or detent 63 extends through the base of the machine, as shown in Fig. 5, and terminates close to the rear end of the arm 61. A spring 65 connecting the pawl or detent 63 with the base of the machine, actuates the said pawl or detent in a direction to bring it above the upper edge of the arm 61, so as to prevent movement of said arm 61 and thereby prevent rocking of the shaft 28 by the key 37. A link 66 is pivoted to the pawl or detent 63 and said link has a hook 67 on its rear end, engaging a rod or pin 68 carried in a frame 69 which is attached to arms 70 rigid with the main shaft 1 of the machine. When the main shaft 1 is in its normal or idle position, the link 66 is held in a position holding the pawl or detent 63 out of the path of movement of the arm 61, so that said arm may move upwardly when the shaft 28 is rocked by depression of the key 37. When the levers 39 and 5 start the rocking movement of the shaft 1, as previously explained, the rod 68 starts forwardly, thereby releasing the hook 66 from tension so that the spring 65 is free to actuate the pawl or detent 63 toward the lever 61. Movement of the pawl or detent 63 is limited by a pin 71 thereon, operating within a slot or opening 72 formed in the bracket 62. I have previously explained that shortly after the links 26 and 44 have been operated by depression of the key 37, and shortly after the shaft 14 is started, the cam 43 (Fig. 7) engages the roller 47 and restores said links 26 and 44 to their idle positions, thereby also restoring the shaft 28 to its idle or normal position. This operation also lowers the arm 61 so that the pawl or detent 63 may engage within a notch or recess 73 in the upper side of said arm. The said pawl or detent 63 thereby locks the shaft 28 against operation by the key 37, and prevents movement of the links 26 and 44, until after the main shaft 1 has been restored to its starting point by retraction of the springs 3.

From the foregoing it will be understood that the separate units, one comprising the machine proper, and the other comprising the motor mechanism, are separately supported, and all that is necessary to be done, in order to bring them into coöperative relation, is to place the machine proper upon the motor frame. The elements 30 prevent displacement of the machine when the motor is operating. There are no couplings or other elements requiring previous adjustment or manipulation, in order to prepare the mechanisms for operation after being brought together. It will be observed also that the motor is actually disengaged, or detached, from the main rock shaft 1 and that there is no direct connection from the motor operating mechanism to said shaft.

The use and operation of adding machines of the Dalton type are well understood. It is understood that it is necessary to rock the shaft 1 for each item to be listed or added, and for each "clearing" operation or whenever a total or sub-total is to be printed. The key 37, which is carried by the machine proper, controls the operation of the motor, to the extent that operation of said key is necessary, in order to enable motor mechanism to rock the shaft 1.

It will be understood that my invention is not restricted, in its adaptability or use, to a Dalton adding machine, but may readily be combined with other machines. I do not restrict myself to the combination of my invention with a Dalton adding machine. It will be apparent that there may be many variations in the construction and arrangement of the elements included within the invention, without departing at all from the principle and spirit of the invention. I do not restrict myself to specific arrangements, but

What I claim and desire to secure by Letters-Patent is:

1. In a machine of the character described, the combination with a lever to be actuated, and a spring for restoring said lever to idle position after it has been actuated, of a shaft, a constantly running motor, optionally operable means for imparting an intermittent rotary motion to said shaft from said motor and for stopping said shaft in the same position after each movement thereof, a lever for actuating said first-named lever, a spring for returning said second-named lever after positive movement thereof in one direction, and an element on said shaft arranged to actuate said second-named lever positively in one direction after which said second-named lever is returned by said spring.

2. In a machine of the character described, the combination with a shaft arranged to be rocked, a lever on said shaft for rocking said shaft in one direction, and a spring for rocking said shaft in the opposite direction after operation of said lever, of a lever arranged to engage with and actuate said first-named lever, a continuously running motor, a revoluble shaft, optionally operable means for imparting an intermittent rotary motion to said revoluble shaft from said motor and for stopping said shaft in the same position after each movement thereof, means for actuating said second-named lever in one direction from said revoluble shaft, and independent means for restoring said second-named lever to idle position after operating as aforesaid.

3. In a machine of the character described, the combination with a shaft arranged to be rocked, and means for restoring said shaft to idle position after having been rocked, of a lever for rocking said shaft, a revoluble shaft for actuating said lever, a constantly running motor, means for imparting an intermittent rotary motion to said revoluble shaft from said motor and for stopping said shaft in the same position after each movement thereof, and means for restoring said lever to idle position after being operated by said shaft.

4. In a machine of the character described, the combination with a rock shaft, and a lever for actuating said rock shaft in one direction, of a continuously running motor, a revoluble element, means for imparting an intermittent rotary movement to said revoluble element from said motor and for stopping said element in the same position after each movement thereof, means for actuating said lever in one direction by said element, means for restoring said lever to idle position after each actuation thereof, and another means for restoring said rock shaft to idle position after each operation thereof by said lever.

5. In a machine of the character described, the combination with a lever to be actuated, and a spring for restoring said lever to idle position after each actuation, of a second lever adapted to engage with and actuate said first-named lever, a shaft, mechanism for imparting an intermittent rotary motion to said shaft and for stopping said shaft in the same position after each movement thereof, means for driving said second named lever in one direction from said shaft effectively to engage with and actuate said first-named lever, and independent means for restoring said second-named lever to idle position after each operation.

6. In a machine of the character described, the combination with a continuously running motor, a shaft, and a wheel constantly rotated by said motor, of a rock shaft, a spring for actuating said rock shaft in one direction, devices for imparting an intermittent rotary movement to said first-named shaft from said wheel and for stopping said shaft in the same position after each movement thereof, connections for positioning said devices so that said wheel will actuate said first-named shaft as aforesaid, elements actuated by said first-named shaft for actuating said rock shaft in opposition to said spring, and means actuated by said first-named shaft for disengaging said devices whereby said shaft will be stopped when it reaches the same position from which it was started and leave said shaft to be returned to its starting point by said spring.

7. In a machine of the character described, the combination with a shaft arranged to be rocked, a lever on said shaft for rocking said shaft in one direction, and a spring for rocking said shaft in the opposite direction after operation by said lever, of a continuously running motor, a revoluble shaft, connections for imparting an intermittent rotary motion to said revoluble shaft from said motor, means normally holding said connections disengaged whereby said revoluble shaft remains stationary, means for connecting said connections whereby said revoluble shaft will be rotated, a second lever arranged to engage with and actuate said first-named lever, means for actuating said second-named lever in one direction by said revoluble shaft, means for restoring said second-named lever to idle position, and means under control by said revoluble shaft for enabling said connections to separate and said revoluble shaft to stop at the end of each revolution thereof.

8. In a machine of the character described, the combination with a shaft to be rocked, and a spring for restoring said shaft to idle position after it has been rocked, of a revoluble shaft, a constantly running motor, connections for imparting an intermittent rotary motion to said revoluble shaft from said motor, a lever driven by said revoluble shaft, means for rocking said first-named shaft by the operation of said lever, a device for restoring said lever to idle position after operation, and means controlled by said revoluble shaft for releasing said connections whereby said revoluble shaft will be enabled to stop automatically at the end of each revolution thereof.

9. In a machine of the character described, the combination with a shaft arranged to be rocked, and means for restoring said shaft to idle position after having been rocked in one direction, of a continuously running motor, a revoluble shaft, means for imparting an intermittent rotary motion to said revoluble shaft from said motor, a lever supported independently of either of said shafts, means for actuating said lever from said revoluble shaft, means for rocking said first-named shaft in one direction by operation of said lever, independent means for restoring said lever to idle position, and means under control of said revoluble shaft for discontinuing the control of said shaft by said motor at the end of each revolution of said revoluble shaft, substantially as described.

10. In a machine of the character described, the combination with a rock shaft, and springs for restoring said shaft to idle position after said shaft has been rocked in opposition to said springs, of a continuously running motor, a lever, a revoluble shaft, connections for imparting an intermittent rotary motion to said revoluble shaft from said motor, means for actuating said lever in one direction by said revoluble shaft, means for rocking said rock shaft by the movement of said lever, independent means for restoring said lever to its starting point after each movement thereof by said revoluble shaft, and means controlled by said revoluble shaft for releasing said connections at the end of each revolution of said revoluble shaft for the purpose of enabling said revoluble shaft to stop, substantially as described.

11. In a machine of the character described, the combination with a lever to be actuated, and a spring for restoring said lever to idle position after each actuation, of a revoluble shaft, mechanism for revolving said shaft intermittently and stopping said shaft in the same position after each operation, a second lever supported independently of said shaft, means for driving said second-named lever in one direction by said shaft effectively to engage with and actuating said first named lever, and independent means for restoring said second-named lever to idle position after each operation.

12. In a machine of the character described, the combination with a shaft to be rocked, and springs for actuating said shaft to its idle position after said shaft has been actuated in opposition to said spring, of a lever for actuating said shaft in opposition to said spring, a motor, a revoluble shaft, means for imparting an intermittent rotary motion to said revoluble shaft from said motor and stopping said shaft, and independent means for restoring said lever to idle position after being operated by said revoluble shaft so as to permit said spring to return said rock shaft to its idle position.

13. In a machine of the character described, the combination with a rock shaft, a lever for actuating said shaft in one direction, and an element for restoring said shaft to idle position after said shaft has been actuated as aforesaid, a revoluble member, means for imparting an intermittent rotary movement to said revoluble member from said motor and for stopping said member in substantially the same position after each movement thereof, means for actuating said lever in one direction by said element, and an actuator for restoring said lever to idle position after each actuation thereof to leave said rock shaft to be returned by said element.

14. In a machine of the character described, the combination with mechanism to be actuated, and devices for restoring said mechanism to its starting point after each actuation thereof, of a lever adapted to actuate said mechanism, a shaft, mechanism for imparting an intermittent rotary motion to said shaft and for stopping said shaft in the same position after each movement thereof, means for driving said lever in one direction from said shaft effectively to actuate said first-named mechanism, and means for restoring said lever to idle position after each operation thereof to leave said first-named mechanism to be returned to its starting point by said devices.

15. In a machine of the character described, the combination with mechanism to be operated, and a spring for restoring said mechanism to its starting point after it has been operated, of a revoluble shaft, a constantly running motor, optionally operable connections for imparting an intermittent rotary motion to said revoluble shaft from said motor, a lever driven by said revoluble shaft, means for actuating said mechanism in opposition to said spring by the operation of said lever, an automatic device for restoring said lever to idle position after operation to leave said mechanism free to be returned to its starting point by said spring, and means controlled by said revoluble shaft for releasing said connections whereby said shaft will be enabled to stop automatically at the end of each revolution thereof.

16. In a machine of the character described, the combination with a mechanism to be actuated, and a spring for restoring said mechanism to its starting point after each actuation, of a revoluble shaft, mechanism for revolving said shaft intermittently and stopping said shaft after each operation, a lever supported independently of said shaft, means for driving said lever in one direction by said shaft effectively to actuate said first-named mechanism, and independent means for restoring said lever to idle position after each operation to leave said first-named mechanism to be returned by said spring.

17. In a machine of the character described, the combination with mechanism to be operated, and a spring for restoring said mechanism to its starting point after it has been operated, of a revoluble shaft, a constantly running motor, devices for imparting an intermittent rotary motion to said revoluble shaft from said motor, optionally operable means controlling the coöperation of said devices, a lever driven by said revoluble shaft, means for actuating said mechanism in opposition to said spring by the operation of said lever, means controlled by said revoluble shaft for interrupting the coöperation between said devices and said motor, and means controlled by said mechanism for preventing operation of said optionally operable means after the coöperation between said devices and said motor has been interrupted, and prior to the return of said mechanism to its starting point.

18. In a machine of the character described, the combination with mechanism to be actuated, and an actuator for restoring said mechanism to its starting point after each actuation thereof, of a constantly running motor, a revoluble shaft, devices for imparting an intermittent rotary motion to said shaft by said motor, optionally operable means for establishing coöperation between said devices and said motor to impart a rotary motion to said shaft, elements actuated by said shaft for actuating said mechanism in opposition to said actuator, means controlled by said shaft for interrupting the coöperation between said devices and said motor, and means controlled by said mechanism for preventing the operation of said optionally operable means after said coöperation has been interrupted and prior to the return of said mechanism to its starting point.

19. In a machine of the character described, the combination with a mechanism to be operated, and a spring for restoring said mechanism to its starting point, of a motor, devices operated by said motor intermittently for actuating said mechanism in opposition to said spring, and means controlled by said mechanism for preventing operation of said devices by said motor during predetermined periods of the operation of said mechanism.

20. In a machine of the character described, the combination with mechanism to be operated, of a motor, elements operated by said motor for actuating said mechanism, optionally operable means for enabling said motor to operate said elements intermittently, and means controlled by said mechanism to prevent operation of said optionally operable means during certain periods of the operation of said mechanism.

In testimony whereof, I have signed my name to this specification in the presence of two subscribing witnesses.

HARRY LANDSIEDEL.

In the presence of—
 BIRNEY DYSART,
 J. P. CLEVLEN.